United States Patent
Yu

(10) Patent No.: US 8,488,093 B2
(45) Date of Patent: Jul. 16, 2013

(54) ARRAY SUBSTRATE FOR LIQUID CRYSTAL DISPLAY AND MANUFACTURING METHOD THEREOF

(75) Inventor: Sang Hee Yu, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 1270 days.

(21) Appl. No.: 11/637,032

(22) Filed: Dec. 12, 2006

(65) Prior Publication Data
US 2007/0153143 A1 Jul. 5, 2007

(30) Foreign Application Priority Data

Dec. 30, 2005 (KR) .................. 10-2005-0135814

(51) Int. Cl.
*G02F 1/1343* (2006.01)
(52) U.S. Cl.
USPC .......................................... 349/141; 349/143
(58) Field of Classification Search
USPC ................................................. 349/141, 143
See application file for complete search history.

(56) References Cited

U.S. PATENT DOCUMENTS

| 2001/0004280 A1* | 6/2001 | Kim et al. ........................ 349/187 |
| 2005/0140897 A1* | 6/2005 | Kim ................................. 349/141 |
| 2005/0195349 A1* | 9/2005 | Shin ................................ 349/124 |
| 2006/0139545 A1* | 6/2006 | Hong ............................. 349/141 |
| 2006/0146242 A1* | 7/2006 | Kim et al. ........................ 349/129 |

* cited by examiner

*Primary Examiner* — Jessica M Merlin
(74) *Attorney, Agent, or Firm* — McKenna, Long & Aldridge, LLP.

(57) ABSTRACT

The present invention relates to an array substrate for a liquid crystal display (LCD) and a manufacturing method thereof. The array substrate comprises gate lines crossing data lines on a transparent substrate to define pixel areas; thin film transistors connected to a gate line and a data line; pixel electrodes overlapping the gate and data lines, the pixel electrodes being connected to one of the thin film transistors through a contact hole, and stretched over two adjacent pixel areas to form an electric field; and storage electrodes overlapping with the gate lines, connected to a pixel electrode through a contact hole, wherein the storage electrodes maintain an intensity of the electric field formed by the pixel electrodes at a level equal to or higher than a predetermined level.

18 Claims, 9 Drawing Sheets

ARRAY SUBSTRATE FOR LIQUID CRYSTAL DISPLAY AND MANUFACTURING METHOD THEREOF

This application claims the benefit of Korean Patent Application No. 10-2005-0135814 filed on Dec. 30, 2005, the entire contents of which are hereby incorporated by reference for all purposes as if fully set forth herein.

BACKGROUND OF THE INVENTION

1. Field of the Invention

The present invention relates to an array substrate for a liquid crystal display (LCD), and a method for manufacturing thereof.

2. Discussion of the Related Art

Generally, a liquid crystal display (LCD) shows an image by using the electro-optical characteristics of a liquid crystal layer. The LCD includes a color filter substrate and an array substrate arranged opposite each other with a liquid crystal layer interposed between them. The array substrate uses a thin film transistor (TFT) as a switching device. The array substrate will be described in detail with reference to FIGS. 1 and 2.

FIG. 1 is a plan view showing an array substrate for an LCD according to the related art. FIG. 2 is a cross-sectional view showing the array substrate of FIG. 1 along a line I-I'.

Referring to FIGS. 1 and 2, the array substrate 1 for an LCD comprises gate lines 20, data lines 30, thin film transistors 40, pixel electrodes 50, common electrodes 52, common lines 54, and storage electrodes 60.

The gate lines 20 and the data lines 30 are formed to be insulated from and to cross each other on a transparent substrate 10 with a gate insulation layer 32 between them to thereby define pixel regions.

The thin film transistors 40 are connected to the gate lines 20 and the data lines 30 and used as switching devices. To be used as a switching device, each thin film transistor 40 comprises a gate electrode 41, a source electrode 42, a drain electrode 43, an active layer 44, and an ohmic contact layer 45.

Each pixel electrode 50 forms an electric field together with a common electrode 52 by using a data voltage supplied from the drain electrode 43. For this, the pixel electrode 50 is connected to the drain electrode 43 through a contact hole 72 that penetrates an inorganic insulation layer 70.

Also, each common electrode 52 forms an electric field together with the pixel electrode 50 by using a common voltage supplied from a common line 54. For this, the common electrode 52 extends from the common line 54 to which it pertains and formed to be crossed with a pixel electrode 50. Also, the common electrodes 52 are formed of the same material as that of the gate lines 20 and the gate electrodes 41 on the same plane. Herein, the electric field is formed by a voltage difference between the common voltage and the data voltage.

The common lines 54 provide the common electrodes 52 with a common voltage supplied from the outside. To provide the common voltage, the common lines 54 are formed of the same material as that of the gate lines 20 and the gate electrodes 41 on the same plane.

The storage electrodes 60 maintain the data voltage of the pixel electrodes 50 at a level higher than a predetermined value. In short, the storage electrodes 60 maintain the data voltage of the pixel electrodes 50 at a uniform level for one frame in the LCD comprising the array substrate 1. To maintain the data voltage, the storage electrodes 60 are connected to the pixel electrodes 50 through the contact holes 74 penetrating the inorganic insulation layer 70 and they are formed as large as possible.

The storage electrodes 60 are insulated from and overlap the common lines 54 with a gate insulation layer 32 interposed between them. Herein, storage capacitances (Cst) are formed at places where the storage electrodes 60, the common lines 54 and the gate insulation layer 32 are overlapped.

In the related art, when the pixel electrodes 50 and the data lines 30 are formed in the array substrate 1 for the LCD, overlay deviation may occur between the pixel electrodes 50 and the data lines 30.

Therefore, there is a problem that the value of parasitic capacitance (Cdp) formed between the pixel electrode 50 and the data line 30 may differ according to each pixel area. The different parasitic capacitance values deteriorate the image quality of the LCD comprising the array substrate 1.

Also, there is a problem that the common lines 54 and the gate lines 20 should be spaced apart from each other by a predetermined space to prevent shorts from occurring between the gate lines 20 and the common lines 54. In addition, the common lines 54 should be formed wide to form the storage capacitance (Cst). Therefore, there is a problem that the LCD comprising the array substrate 1 has a decreased aperture ratio.

SUMMARY OF THE INVENTION

Accordingly, the present invention is directed to an array substrate for a liquid crystal display and manufacturing method that obviates one or more of the problems due to limitations and disadvantages of the related art.

An advantage of the present invention to provide an array substrate for a liquid crystal display (LCD) that can minimize fluctuation in values of parasitic capacitance formed between pixel electrodes and data lines, and a manufacturing method thereof.

Another advantage of the present invention to provide an array substrate for an LCD that can increase the aperture ratio by changing the structure of a storage capacitance, and a manufacturing method thereof.

The advantages of the present invention are not limited to the above-mentioned ones, and those skilled in the art that the present invention pertains to can be able to understood the other unmentioned objects from the following description.

To achieve these and other advantages and in accordance with the purpose of the invention, as embodied and broadly described, provided is an array substrate for a liquid crystal display (LCD), comprising: gate lines crossing data lines on a transparent substrate to define pixel areas; thin film transistors connected to a gate line and a data line; pixel electrodes overlapping the gate and data lines, the pixel electrodes being connected to one of the thin film transistors through a contact hole, and stretched over two adjacent pixel areas to form an electric field; and storage electrodes overlapping the gate line, the storage electrodes being connected to pixel electrodes through a contact hole, wherein the storage electrodes maintain an intensity of the electric field formed by the pixel electrodes at a level equal to or higher than a predetermined level.

In another aspect of the present invention, provided is a method for manufacturing an array substrate for an LCD, comprising: forming gate lines and gate electrodes on a transparent substrate; forming a gate insulation layer, an active layer and an ohmic contact layer on the transparent substrate; forming data lines which are insulated from and cross the gate lines on the transparent substrate and define pixel areas, source electrodes which are connected to the data lines, drain electrodes facing the source electrodes, and storage electrodes which are insulated from and overlap the gate lines; forming an organic insulation layer on the transparent substrate; and forming pixel electrodes which are insulated from and overlap the gate and data lines, wherein the pixel electrodes are formed over two adjacent pixel areas to thereby form an electric field.

The array substrate for an LCD and the manufacturing method thereof, which are suggested in the present invention, can minimize the fluctuation in the parasitic capacitance formed between the pixel electrodes and the data lines by overlapping the pixel electrodes with the data lines. Therefore, the LCD comprising the array substrate can have an improved image quality.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and are together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Hereinafter, an array substrate for a liquid crystal display (LCD) of an embodiment of the present invention and a manufacturing method thereof will be described in detail with reference to the accompanying drawings.

Figure 1:
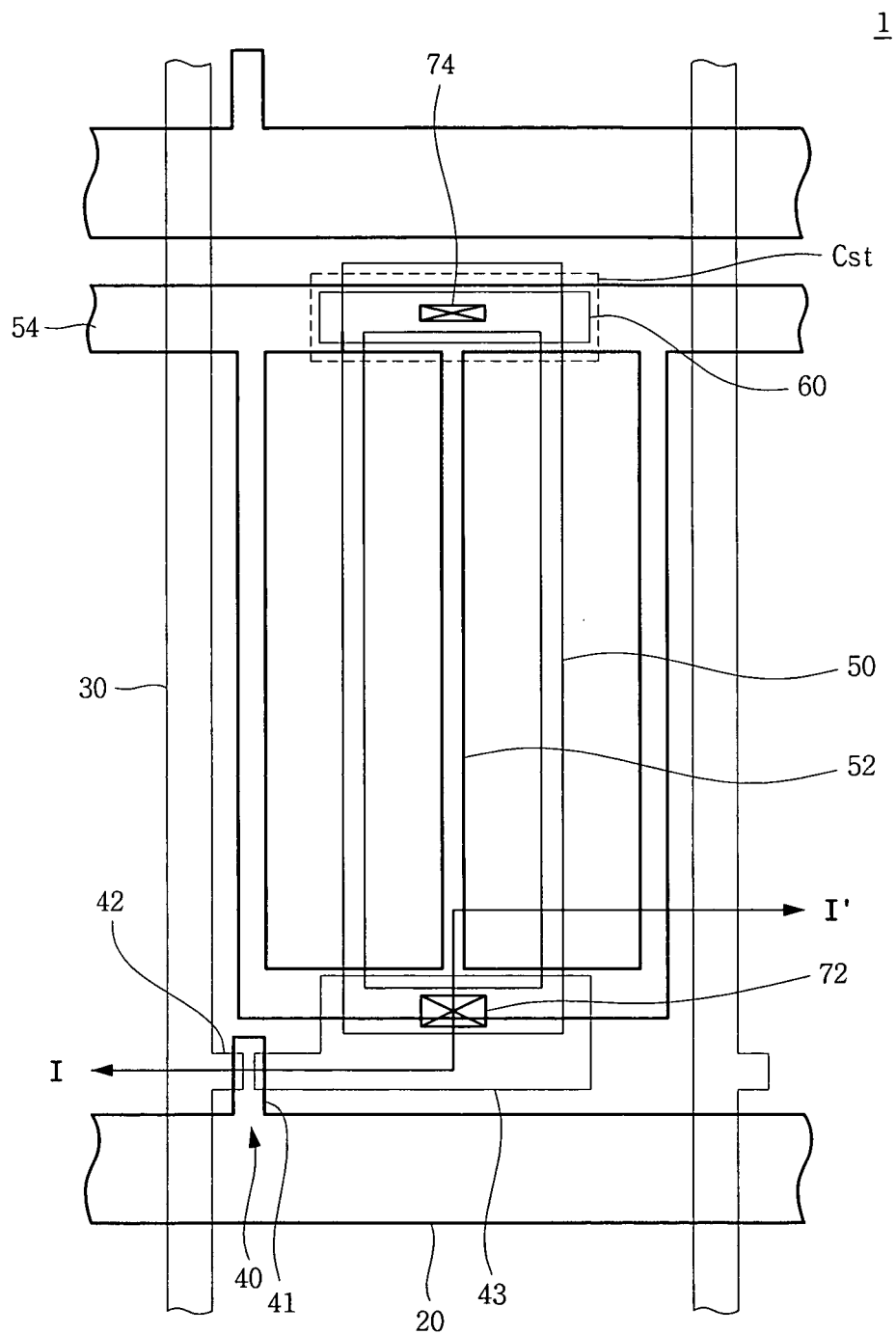
FIG. 1 is a plan view illustrating an array substrate for a liquid crystal display (LCD) according to a related art.
Figure 2:
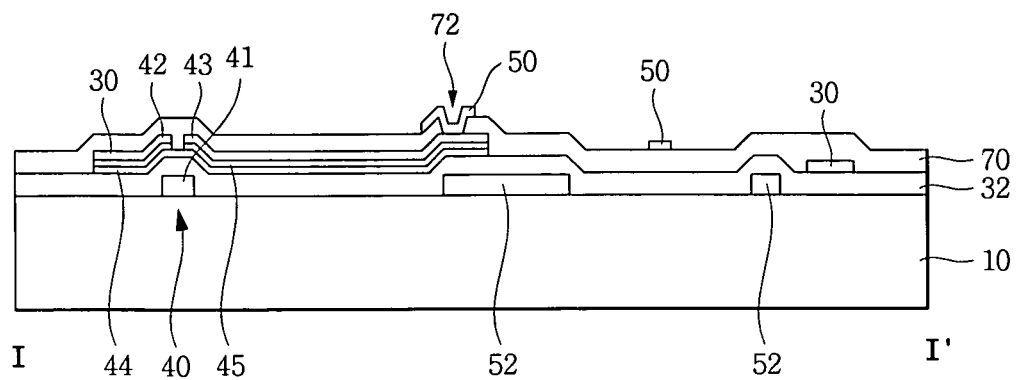
FIG. 2 is a cross-sectional view showing the array structure of FIG. 1 along a line I-I'.
Figure 3:
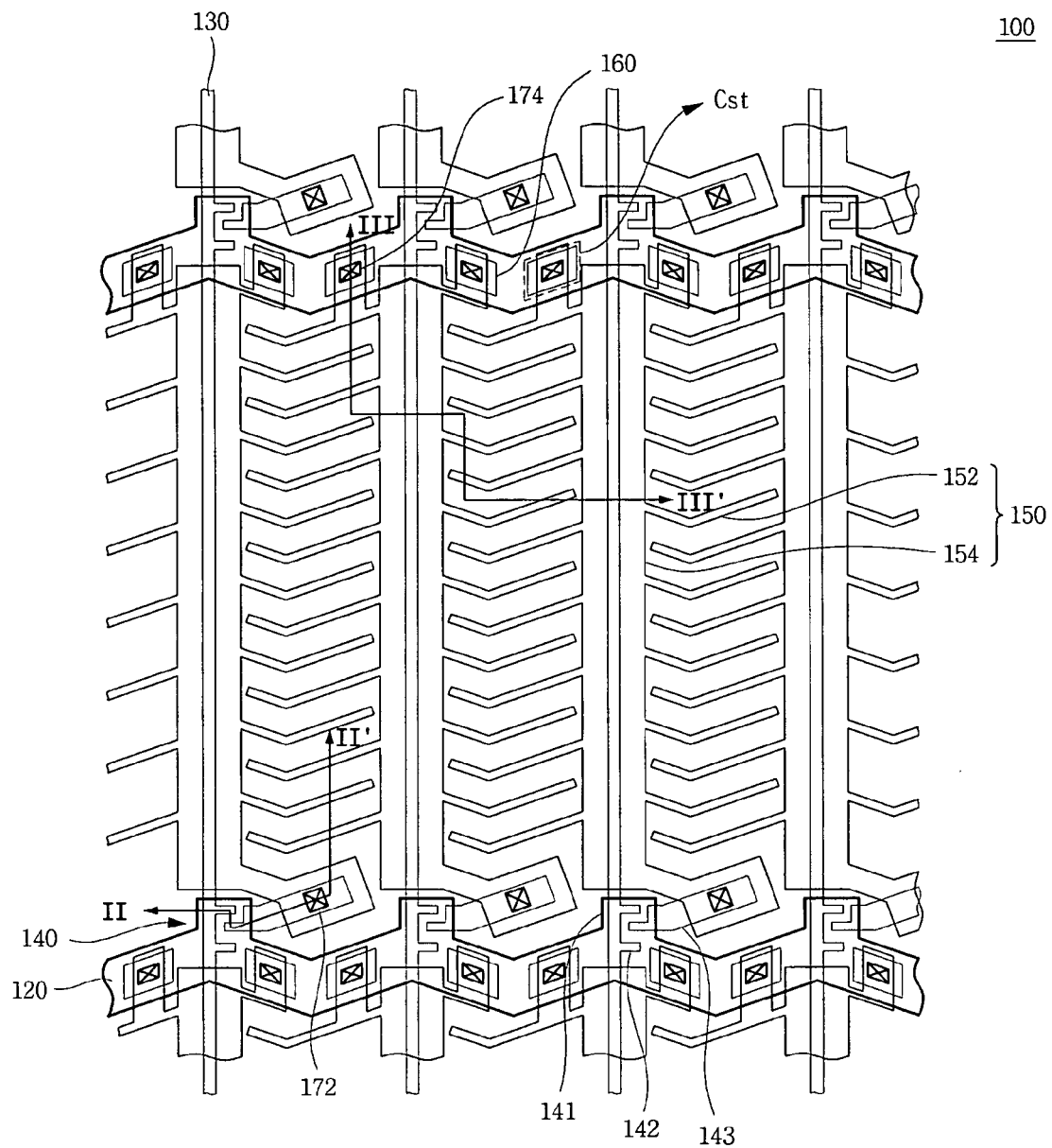
FIG. 3 is a plan view describing an array substrate for an LCD according to an embodiment of the present invention.
Figure 4:
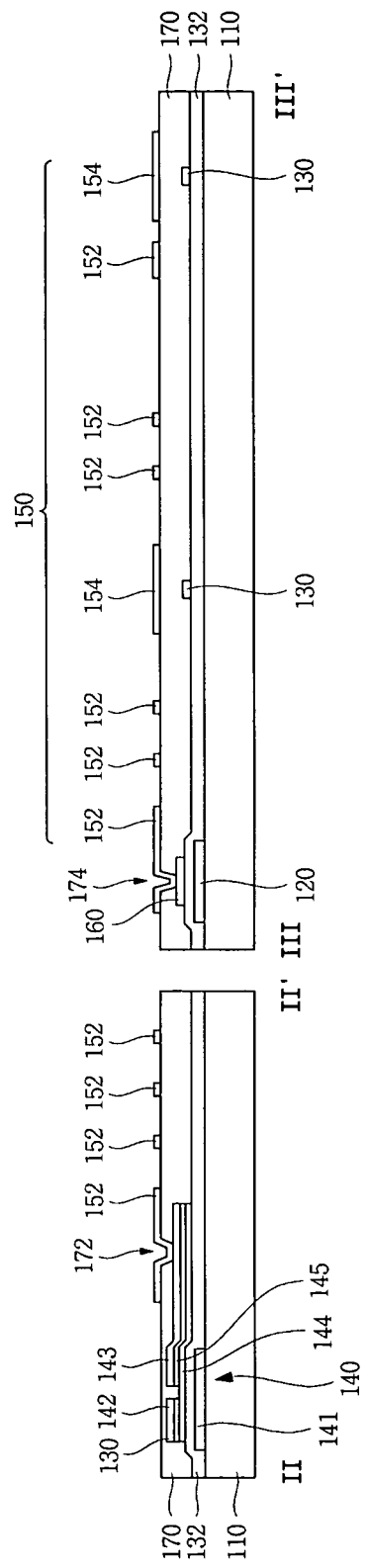
FIG. 4 shows cross sections of the array substrate of FIG. 3 along lines II-II' and III-III', respectively.

FIG. 3 is a plan view illustrating an array substrate for an LCD according to an embodiment of the present invention. FIG. 4 illustrates cross sections of the array substrate of FIG. 3 along lines II-II' and III-III', respectively.

Referring to FIGS. 3 and 4, the array substrate 100 for an LCD comprises gate lines 120, data lines 130, thin film transistors 140, pixel electrodes 150, and storage electrodes 160. The array substrate 100 further comprises an organic insulation layer 170.

The gate lines 120 and the data lines 130 are formed to be insulated from and cross with each other on a transparent substrate 110 to thereby define pixel areas. Specifically, the gate lines 120 and the data lines 130 are formed on the transparent substrate 110 with at least one insulation layer, for example, a gate insulation layer 132, between them to thereby define pixel areas. The gate lines 120 and the data lines 130 will be described in detail, hereinafter.

The gate lines 120 provide a gate on/off voltage from a gate driving circuit formed at the outskirt of the array substrate 100 to gate electrodes 141 of the thin film transistors 140. Herein, one or both sides of the gate lines 120 is/are extended to be connected to the gate driving circuit.

For the connection, the gate lines 120 may be formed of Cr or Cr alloy, Al or Al alloy, Mo or Mo alloy, Ag or Ag alloy, Cu or Cu alloy, Ti or Ti alloy, Ta or Ta alloy in at least one layer on the transparent substrate 110.

The gate lines 120 may be formed, for example, in the shape of a chevron. In other words, the gate lines 120 may be bent at least once. The bent shape increases the aperture ratio of the LCD comprising the array substrate 100.

The data lines 130 provide a data voltage from a data driving circuit formed at the outskirt of the array substrate 100 to source electrodes 142 of the thin film transistors 140. Herein, one or both sides of the data lines 130 is/are extended to be connected to the data driving circuit.

For the connection, the data lines 130 may be formed of Cr or Cr alloy, Al or Al alloy, Mo or Mo alloy, Ag or Ag alloy, Cu or Cu alloy, Ti or Ti alloy, Ta or Ta alloy in at least one layer on the transparent substrate 110.

The thin film transistors 140 are connected to the gate lines 120 and the data lines 130 and used as switching devices. Each thin film transistor 140 comprises a gate electrode 141, a source electrode 142, a drain electrode 143, an active layer 144, and an ohmic contact layer 145. The thin film transistors 140 can be formed at crossings of the gate lines 120 and the data lines 130.

The gate electrodes 141 turn on/off the thin film transistors 140 based on a gate on/off voltage supplied from the gate lines 120. That is, the gate electrodes 141 switch the thin film transistors 140. For this, the gate electrodes 141 are connected to the gate lines 120 and are formed of the same material as the gate lines 120 and on the same plane.

The source electrodes 142 provide a data voltage from the data lines 130 to the drain electrodes 143 through the active layer 144, when the thin film transistors 140 are turned on based on a gate on voltage transmitted from the gate electrodes 141. For this, the source electrodes 142 are connected to the data lines 130, and the source electrodes 142 are formed of the same material as the data lines 130 and on the same plane. Herein, the source electrodes 142 may be overlapped with the gate electrodes 141 with the gate insulation layer between them.

The drain electrodes 143 provide a data voltage supplied from the source electrodes 142 to the pixel electrodes 150. For this, the drain electrodes 143 may be formed of the same material as the data lines 130 and on the same plane. Also, the drain electrodes 143 may be formed to face the source electrodes 142. Herein, the drain electrodes 143 may overlap the gate electrodes 141 with the gate insulation layer 132 between them.

The active layer 144 forms a channel of a thin film transistor 140. The active layer 144 may be formed of amorphous silicon or polysilicon. Hereinafter, the present invention will be described with reference to the active layer 144 being formed of amorphous silicon as an example.

The ohmic contact layer 145 is disposed for ohmic contact between the source electrodes 142 and the active layer 144 and ohmic contact between the drain electrodes 143 and the active layer 144. The ohmic contact layer 145 is formed of amorphous silicon including n+ impurity.

The pixel electrodes 150 are formed to be insulated from and overlap the gate lines 120 and the data lines 130. The pixel electrodes 150 are stretched over two adjacent pixel areas and form an electric field. Specifically, the pixel electrodes 150 form an electric field based on a difference between data voltages supplied from the two drain electrodes 143 formed in the two adjacent pixel areas, respectively. The pixel electrodes 150 may be connected to the drain electrodes 143 through contact holes 172 penetrating at least one insulation layer, for example, an organic insulation layer 170.

The pixel electrodes 150 may be formed of a transparent conductive material to increase the aperture ratio of the LCD comprising the array substrate 100. Herein, the transparent conductive material may be any one selected from the group consisting of indium tin oxide (ITO) and indium zinc oxide (IZO).

As aforementioned, the pixel electrodes 150 form an electric field over two adjacent pixel areas. To form the electric field, each pixel electrode 150 includes horizontal parts 152 and a vertical part 154.

The horizontal parts 152 extend from the vertical part 154 on both sides to thereby be stretched over the two adjacent pixel areas. Herein, the two horizontal parts 152 extend from the vertical part 154 on both sides in one pixel area and are arranged alternately. Thus, the horizontal parts 152 extend from the two vertical parts 154 of one pixel area on each side can form an electric field by using a difference between data voltages supplied from two adjacent drain electrodes 143. The electric field formed by the horizontal parts 152 may be a horizontal electric field.

The horizontal parts 152 may be formed in the shape of a chevron. That is, the horizontal parts 152, too, can be formed to be bent at least once, just as the gate lines 120 are. The horizontal parts 152 are bent to form more than two domains in the LCD comprising the array substrate 100. The bent structure gives the LCD a wide viewing angle and prevents a color shift defect.

The vertical part 154 is insulated from and overlaps a data line 130. The vertical part 154 connects the horizontal parts 152. In short, the vertical part 154 makes it possible for a pixel electrode 150 to be stretched over two adjacent pixel areas.

Herein, the width of the vertical part 154 may be wider than that of the data line 130 to minimize fluctuation in the value of parasitic capacitance (Cdp) formed between the vertical part 154 and the data line 130. In this case, the data line 130 which has a relatively narrower width may be completely overlapped by the vertical part 154 which has a relatively wider width. The widths of the vertical part 154 and the data line 130 may be determined in consideration of overlay deviation that may occur when the pixel electrode 150 and the data line 130 are formed.

Also, the width of the vertical part 154 may be formed smaller than the width of the data lines 130 to minimize fluctuation in the parasitic capacitance (Cdp). In this case, the vertical part 154 which has a relatively narrower width may be completely overlapped by the data lines 130 which has a relatively wider width. The widths of the vertical part 154 and the data line 130 may be determined in consideration of the overlay deviation that may occur when the pixel electrode 150 and the data line 130 are formed.

Therefore, the LCD comprising the array substrate 100 can have an improved image quality. The storage electrodes 160 maintain an intensity of the electric field formed by the pixel electrode 150 at a predetermined level or higher. For this, the storage electrodes 160 may be connected to the pixel electrodes 150 through contact holes 174 penetrating the organic insulation layer 170. Herein, the storage electrodes 160 may be formed of the same material as that of the data lines 130 and on the same plane.

Herein, the storage electrodes 160 include one of which may be formed in the pixel area and the other of which may be formed adjacent the pixel area.

The storage electrodes 160 may be insulated from and overlapped with the gate lines 120 with the gate insulation layer 132 between them. Herein, storage capacitances (Cst) are formed in places where the storage electrodes 160, the gate lines 120 and the gate insulation layer 132 are overlapped.

When a kick-back voltage ($\Delta Vp$) is generated from the gate off voltage in the storage electrode 160, the data voltage of the pixel electrodes 150 are maintained at a level equal to or higher than the gate off voltage. This can make the storage electrodes 160 small. Consequently, the aperture ratio of the LCD comprising the array substrate 100 is increased.

The organic insulation layer 170 is disposed between the data lines 130 and the pixel electrodes 150 to insulate them from each other. Herein, the organic insulation layer 170 may be formed of an acryl-based material having a low dielectric constant. For this reason, the parasitic capacitance (Cdp) formed between the data line 130 and the pixel electrode 150 can be small, and thus the data lines 130 and the pixel electrodes 150 can be overlapped.

FIGS. 5A to 5E are cross-sectional views illustrating a method for manufacturing the array substrate for an LCD shown in FIG. 3.

Figure 5A:
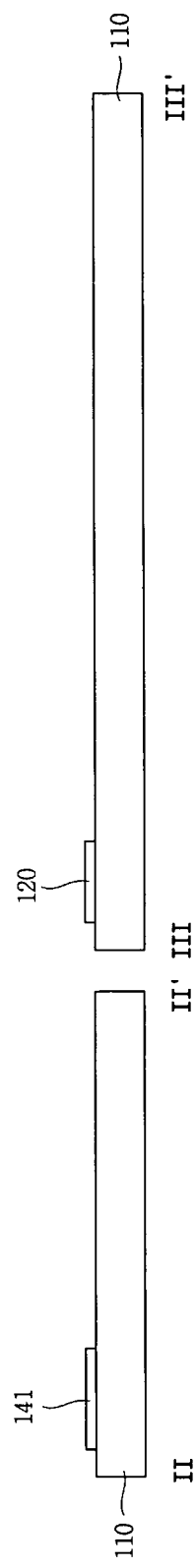
FIGS. 5A to 5E are cross-sectional views describing a method for manufacturing the array substrate for an LCD shown in FIG. 3.

First, as illustrated in FIG. 5A, gate lines 120 and gate electrodes 141 are formed on a transparent substrate 110.

Specifically, gate metal layers are formed of, for example, Cr or Cr alloy, Al or Al alloy, Mo or Mo alloy, Ag or Ag alloy, Cu or Cu alloy, Ti or Ti alloy, Ta or Ta alloy in at least one layer on an entire surface of the transparent substrate 110. The gate metal layers may be formed by sputtering method.

Subsequently, at least one layer of gate lines 120 and gate electrodes 141 are formed by patterning the gate metal layers through photolithography process using a first mask.

Figure 5B:
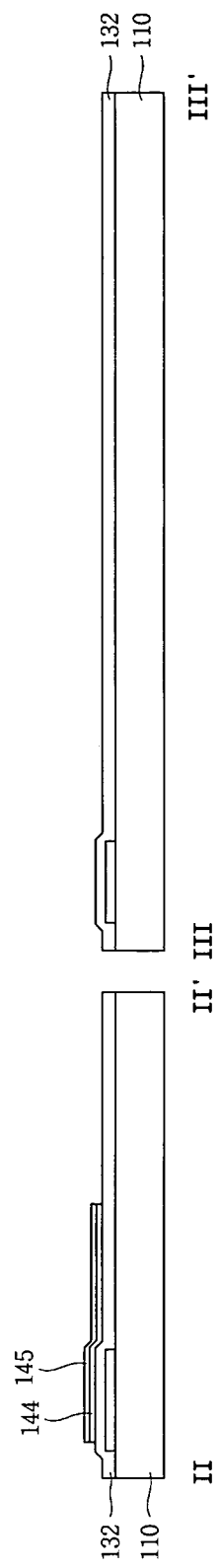

Referring to FIG. 5B, a gate insulation layer 132, an active layer 144, and an ohmic contact layer 145 are disposed on the transparent substrate 110.

Specifically, at least one gate insulation layer 132 is formed of SiNx and SiOx on the entire surface of the transparent substrate 110. Subsequently, the active layer 144 is formed of amorphous silicon on the entire surface of the transparent substrate 110, and the ohmic contact layer 145 is formed of amorphous silicon including n+ impurity. The gate insulation layer 132, the active layer 144 and the ohmic contact layer 145 may be formed in a chemical vapor deposition (CVD) method.

Subsequently, the active layer 144 and the ohmic contact layer 145 are patterned through a photolithography process using a second mask.

Figure 5C:
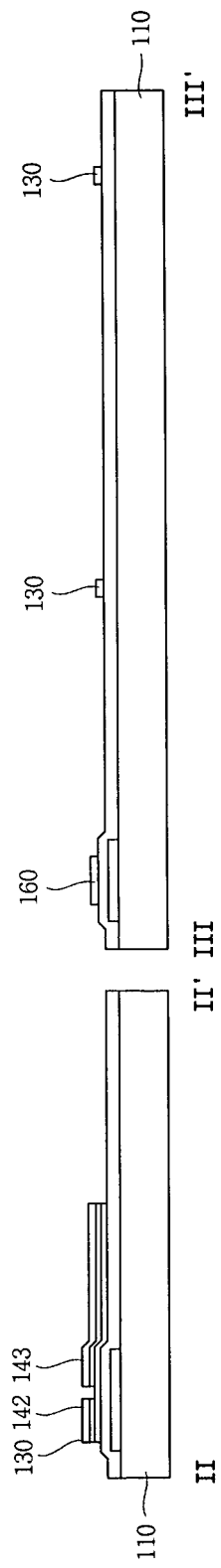

Referring to FIG. 5C, data lines 130, source electrodes 142, drain electrodes 143 and storage electrodes 160 are formed on the transparent substrate 110.

Specifically, data metal layers are formed of Cr or Cr alloy, Al or Al alloy, Mo or Mo alloy, Ag or Ag alloy, Cu or Cu alloy, Ti or Ti alloy, Ta or Ta alloy in at least one layer on the entire surface of the transparent substrate 110. The data metal layers may be formed by sputtering.

Subsequently, the data metal layers are patterned through a photolithographic etching process using a third mask to thereby form at least one layer of data lines 130, source electrodes 142, drain electrodes 143, and storage electrodes 160.

Subsequently, the active layer 144 between the source electrodes 142 and the drain electrodes 143 is exposed by etching the ohmic contact layer exposed between the source electrodes 142 and the drain electrodes 143. Herein, the etching may be done to a depth to etch out some of the active layer 144, too.

Figure 5D:
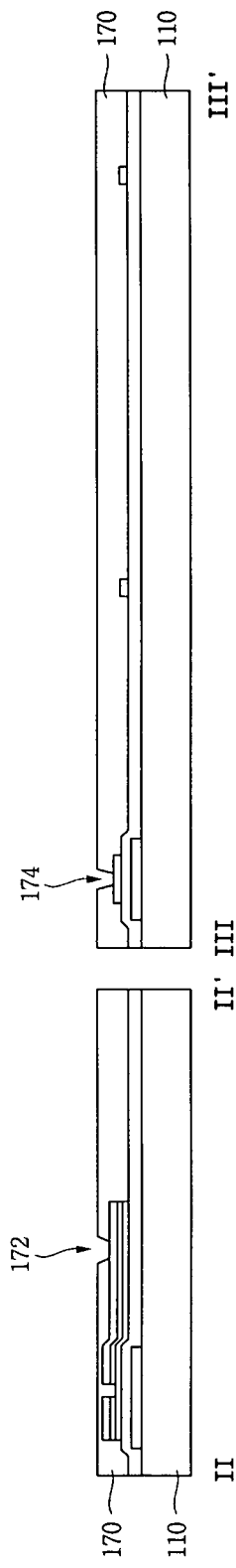

Referring to FIG. 5D, an organic insulation layer 170 is disposed on the transparent substrate 110.

Specifically, the organic insulation layer 170 is formed of an acryl-based material on the entire surface of the transparent substrate 110. The organic insulation layer 170 is formed by using a method selected from the group consisting of spin coating, slit coating, spin and slit coating, and spinless coating.

Subsequently, contact holes 172 and 174 are formed to penetrate the organic insulation layer 170 through a photolithography process using a fourth mask.

Figure 5E:
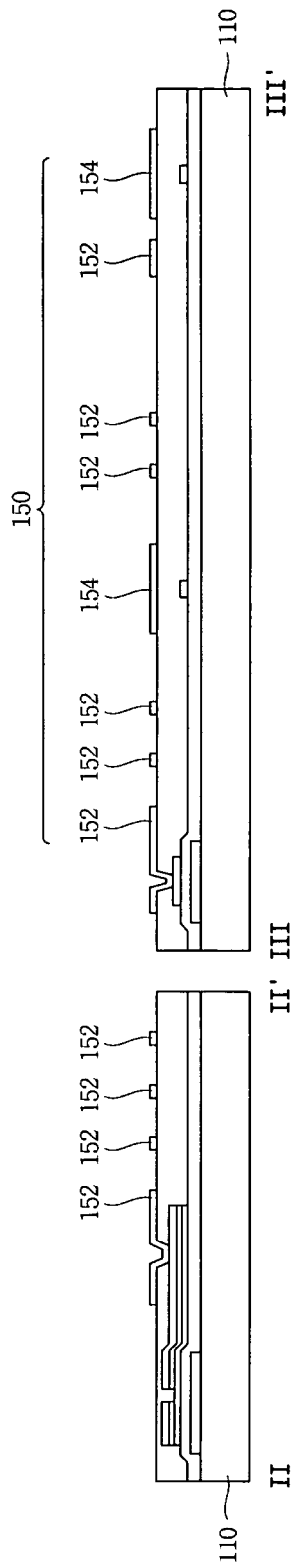

Referring to FIG. 5E, pixel electrodes 150 are formed on the transparent substrate 110. The pixel electrodes are formed to include horizontal portions 152 and vertical portions 154.

Specifically, a transparent conductive metal layer is formed of any one material selected from the group consisting of ITO and IZO on the entire surface of the transparent substrate 110. The transparent conductive metal layer may be formed by sputtering.

Subsequently, photolithographic etching process is performed by using a fifth mask to thereby complete the fabrication of the pixel electrodes 150.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display (LCD), comprising:
    gate lines crossing data lines on a transparent substrate to define pixel areas;
    thin film transistors connected to the gate lines and the data lines;
    pixel electrodes overlapping the gate and data lines, one pixel electrode being connected to one of the thin film transistors through a contact hole, and stretched over two adjacent pixel areas, wherein an electric field parallel to the transparent substrate is formed between the pixel electrode connected to one of the thin film transistors and another pixel electrode being connected to a neighboring thin film transistor,
    wherein each pixel electrode comprises a vertical part parallel with and overlapping the data line and a plurality of horizontal parts extended from the vertical part to the two adjacent pixel areas, and
    wherein the horizontal parts of the one pixel electrode and the horizontal parts of the another pixel electrode are alternately arranged in one of the two adjacent pixel areas; and
    storage electrodes overlapping the gate line, the storage electrodes being connected to one of the pixel electrodes through a contact hole, wherein the storage electrodes maintain intensity of the electric field formed by the pixel electrodes at a level equal to or higher than a predetermined level.

2. The array substrate as claimed in claim 1, further comprising:
    an organic insulation layer between the data lines and the pixel electrodes.

3. The array substrate as claimed in claim 2, wherein the organic insulation layer is an acryl-based material.

4. The array substrate as claimed in claim 1, wherein the horizontal parts are in a shape of a chevron.

5. The array substrate as claimed in claim 1, wherein a width of the vertical part is larger than a width of the data lines.

6. The array substrate as claimed in claim 1, wherein a width of the vertical part is smaller than a width of the data lines.

7. The array substrate as claimed in claim 1, wherein the pixel electrodes are a transparent conductive material.

8. The array substrate as claimed in claim 7, wherein the transparent conductive material is any one selected from a group consisting of indium tin oxide (ITO) and indium zinc oxide (IZO).

9. The array substrate as claimed in claim 1, wherein the storage electrodes are a same material as a material of the data lines and on a same plane that the data lines.

10. The array substrate as claimed in claim 9, wherein the storage electrodes include one of which is formed in the pixel area and the other of which is formed adjacent the pixel area.

11. The array substrate as claimed in claim 1, wherein the gate lines are chevron-shaped.

12. A method for manufacturing an array substrate for an LCD, comprising:
    forming gate lines and gate electrodes on a transparent substrate;
    forming a gate insulation layer, an active layer and an ohmic contact layer on the transparent substrate;
    forming data lines which are insulated from and cross the gate lines on the transparent substrate and define pixel areas, source electrodes which are connected to the data lines, drain electrodes facing the source electrodes, and storage electrodes which are insulated from and overlap the gate lines;
    forming an organic insulation layer on the transparent substrate; and
    forming pixel electrodes which are insulated from and overlap the gate and data lines, wherein each pixel electrode is formed over two adjacent pixel areas and an electric field parallel to the transparent substrate is formed between one pixel electrode connected to one of a plurality of thin film transistors and another pixel electrode being connected to a neighboring thin film transistor,
    wherein each pixel electrode comprises a vertical part parallel with and overlapping the data line and a plurality of horizontal parts extended from the vertical part to the two adjacent pixel areas, and
    wherein the horizontal parts of the one pixel electrode and the horizontal parts of the another pixel electrode are alternately arranged in one of the two adjacent pixel areas.

13. The method as claimed in claim 12, wherein the organic insulation layer is formed of an acryl-based material.

14. The method as claimed in claim 12, wherein the horizontal parts are formed in a shape of a chevron.

15. The array substrate as claimed in claim 12, wherein a width of the vertical parts is greater than a width of the data lines.

16. The array substrate as claimed in claim 12, wherein a width of the vertical parts is smaller than a width of the data lines.

17. The array substrate as claimed in claim 12, wherein the pixel electrodes are formed of a transparent conductive material which is any one selected from a group consisting of indium tin oxide (ITO) and indium zinc oxide (IZO).

18. The array substrate as claimed in claim 12, wherein the gate lines are formed in a shape of a chevron.

\* \* \* \* \*